March 12, 1935.　　　F. A. PARSONS　　　1,994,253
MACHINE TOOL TRANSMISSION AND CONTROL
Filed June 1, 1931　　　6 Sheets-Sheet 1

INVENTOR
Fred G. Parsons

March 12, 1935.  F. A. PARSONS  1,994,253
MACHINE TOOL TRANSMISSION AND CONTROL
Filed June 1, 1931    6 Sheets-Sheet 2
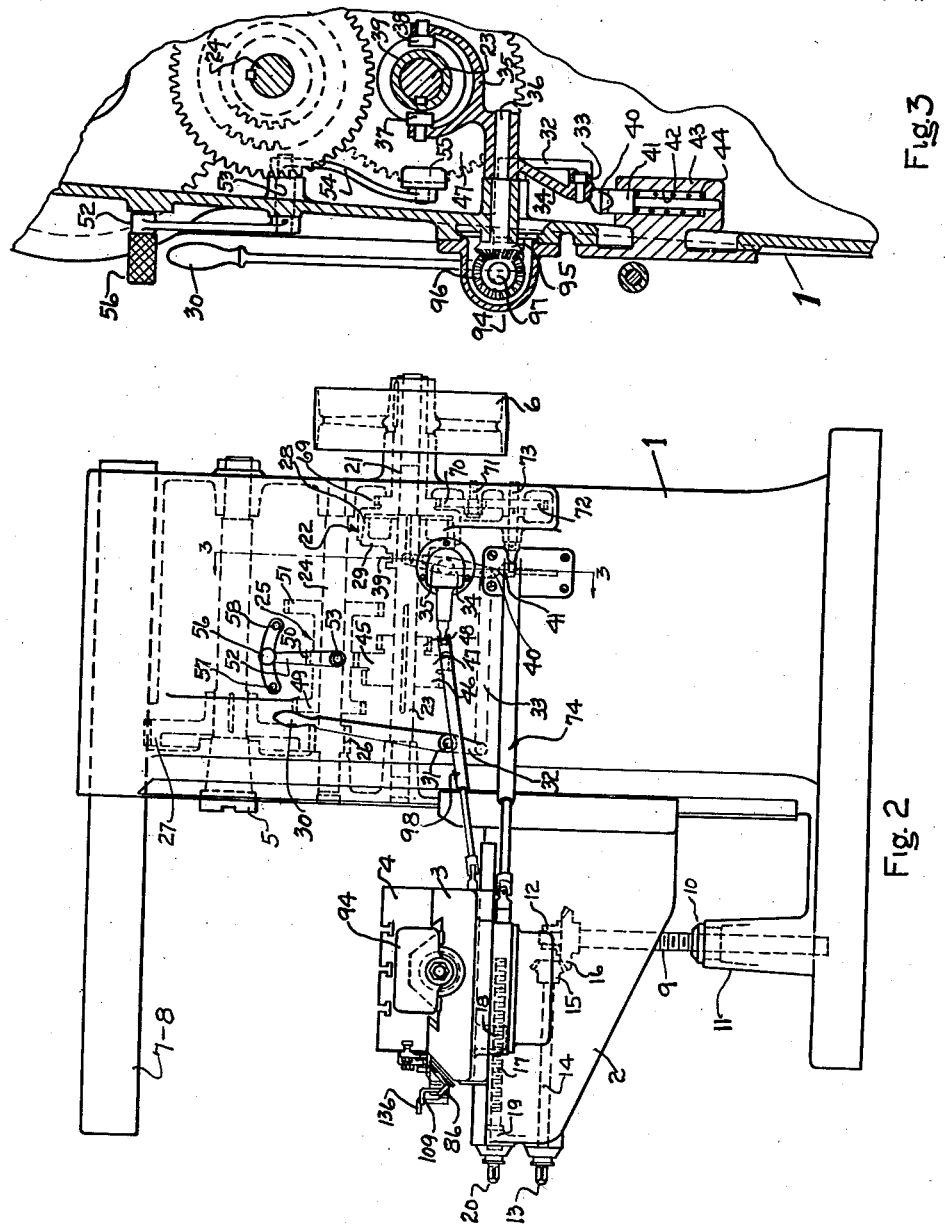
INVENTOR
Fred A. Parsons

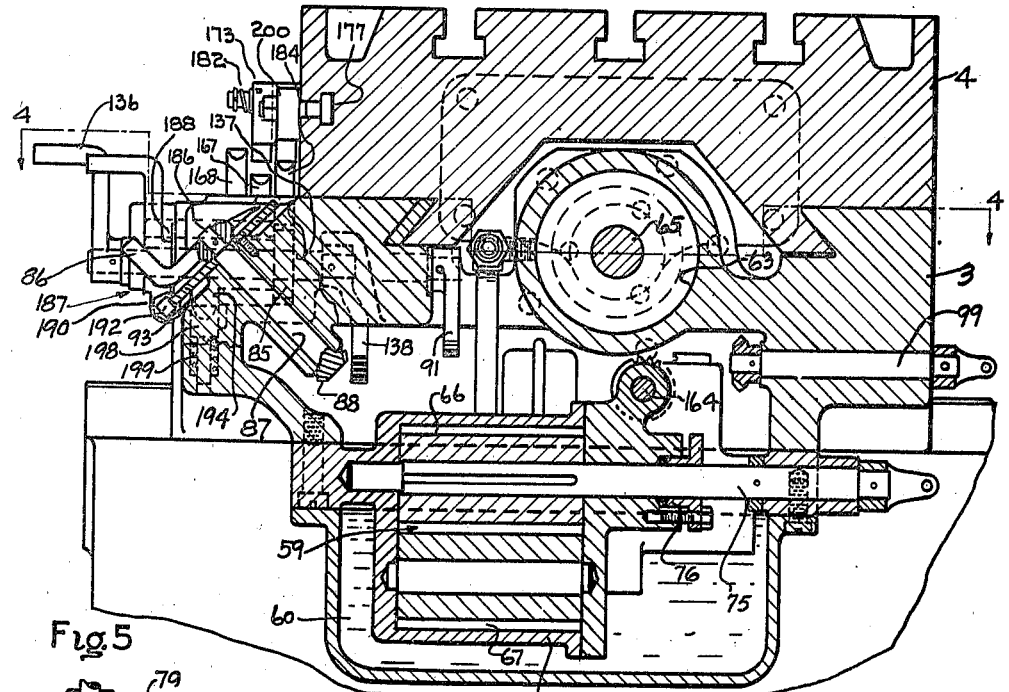
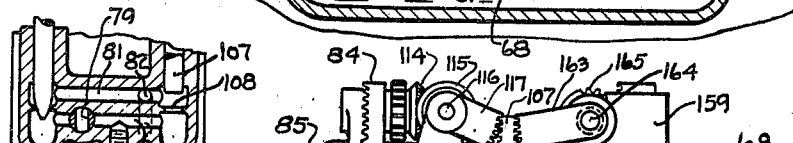
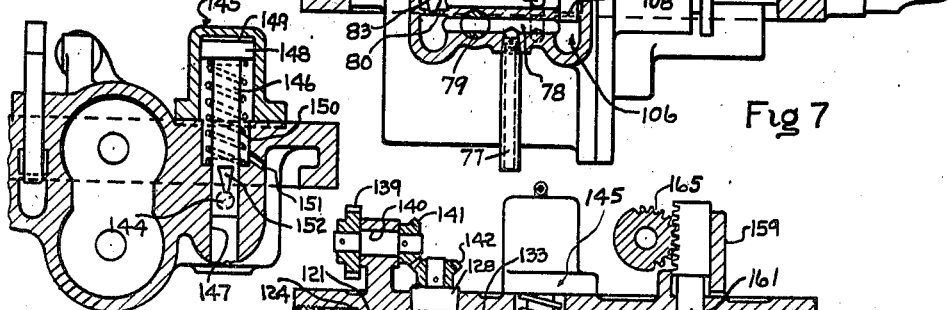
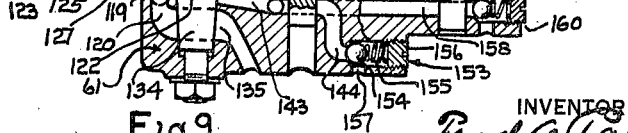

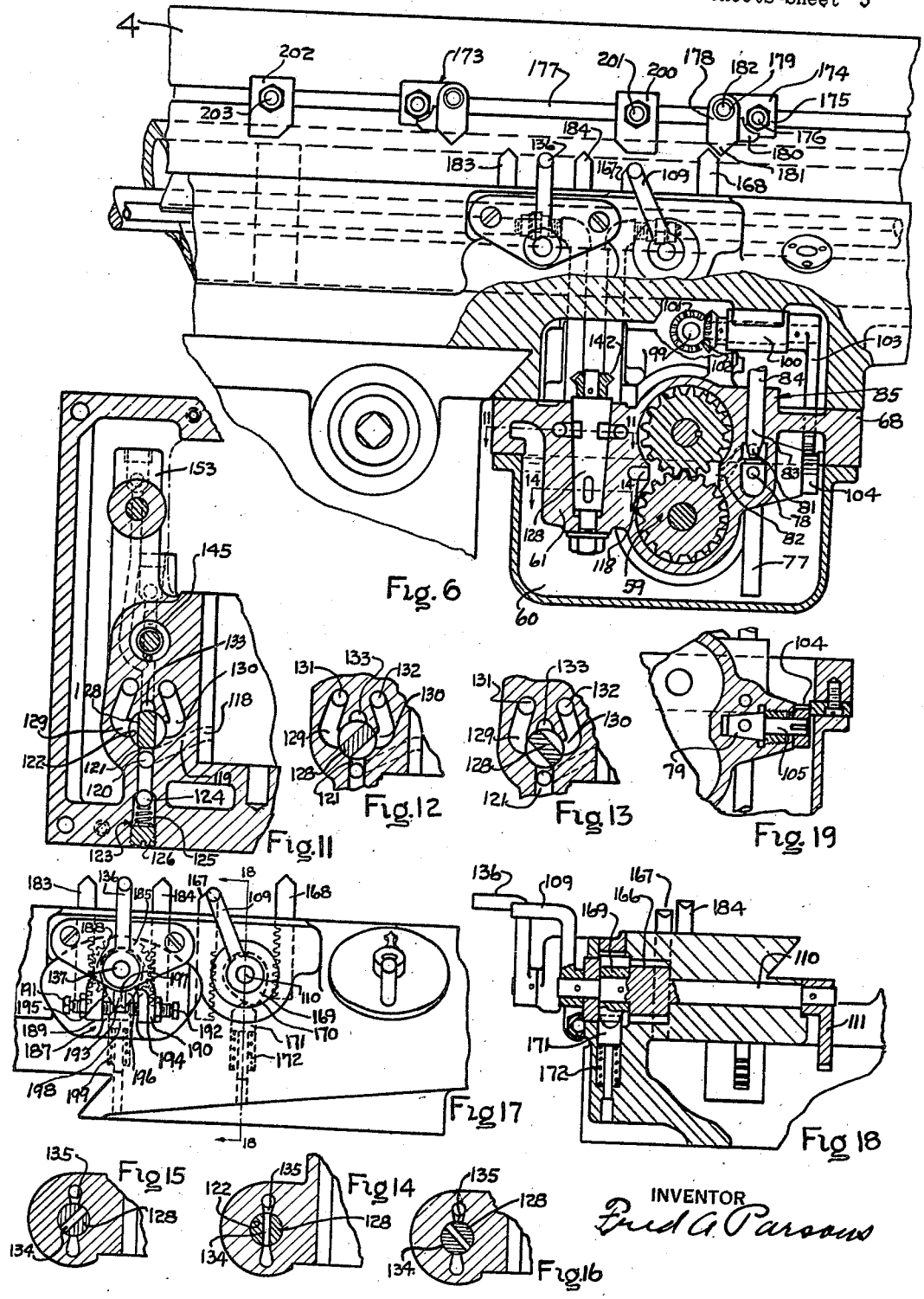

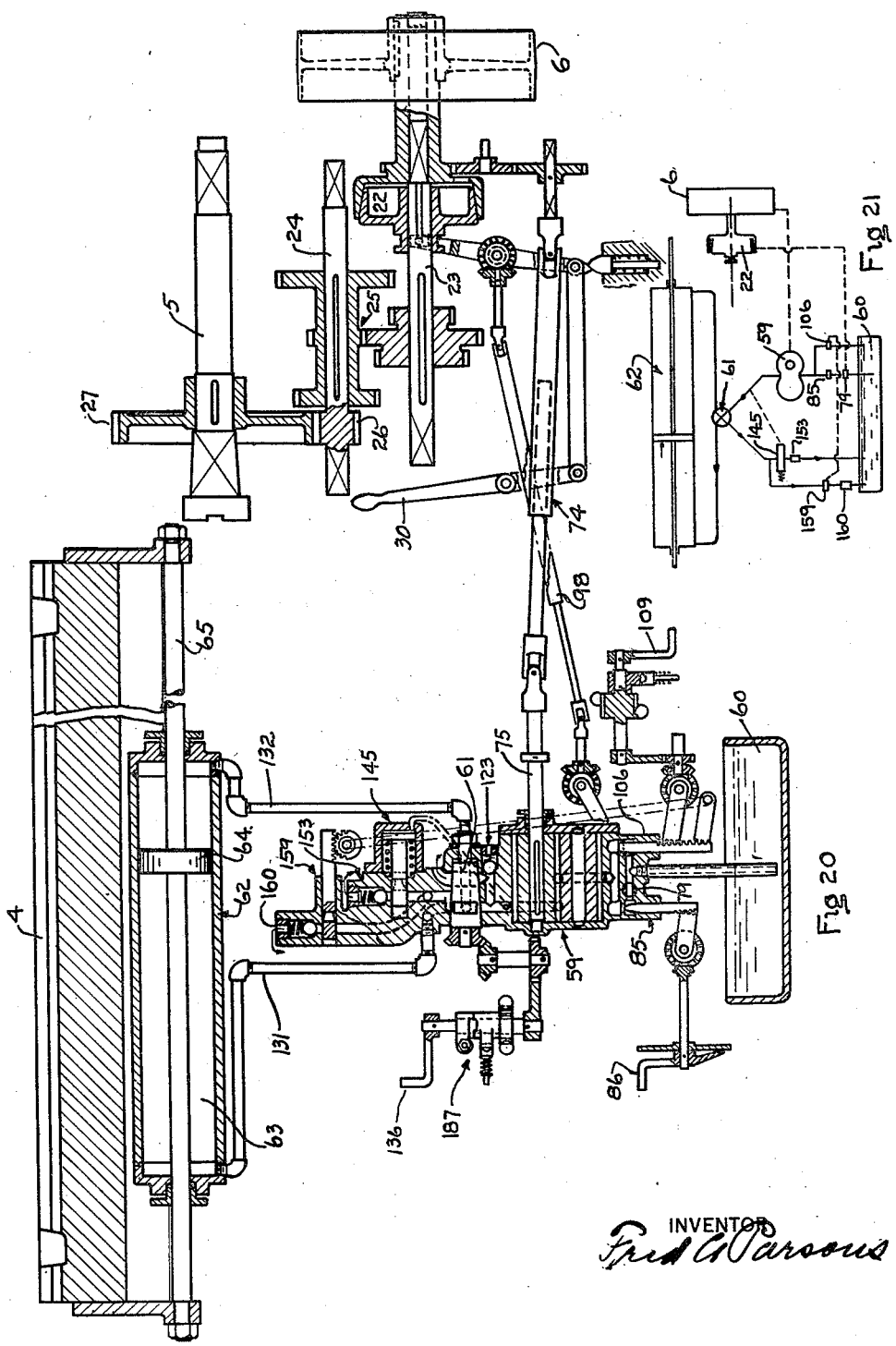

Patented Mar. 12, 1935

1,994,253

UNITED STATES PATENT OFFICE 1,994,253

MACHINE TOOL TRANSMISSION AND CONTROL

Fred A. Parsons, Milwaukee, Wis., assignor to Kearney & Trecker Corporation, West Allis, Wis.

Application June 1, 1931, Serial No. 542,777

35 Claims. (Cl. 90—21.5)

This invention relates to machine tools and more particularly to transmission and control mechanism therefor.

It is a purpose of the invention to provide an improved machine tool transmission which is in part hydraulic and in part mechanical.

Another purpose is to provide such a transmission having a single pump operable for different functions as, for instance, feed and rapid traverse movements.

A further purpose is to provide such devices adapted to permit the use of a very simple pump and in combination with improved control devices particularly in a milling machine.

Another purpose is to provide a single pump transmission including a plurality of adjustable throttles each having its own independent control function.

Another purpose is to provide such throttles in a specific relationship in the hydraulic circuit, namely, in the inlet passage of the pump.

A further purpose is to provide a machine tool in which feed movement is prevented at such times as the spindle is stopped, particularly in a milling machine and an improved and simplified combination in which this result is accomplished, and to provide such a transmission in which rapid traverse movement is available at all times whether or not the spindle is operating.

A further purpose is to provide a machine tool, particularly a milling machine, in which certain of the movements may be automatically controlled when desired, and by improved and simplified means.

A further purpose is to provide a machine tool, particularly a milling machine, with means for preventing overrun during feed movement, and in an improved and simplified combination.

Still other specific purposes will be apparent from the specification and claims, and a further purpose is generally to simplify and improve the construction and operation of machine tools, particularly of milling machines.

The invention resides in the combination and arrangement of parts as herein illustrated, described, and claimed, and in such modifications of the structure illustrated as may be equivalent to the claims.

Like reference characters indicate like parts throughout the specification and in the various views of the drawings in which:

Fig. 2 is a right-side elevation of the same machine.

Fig. 3 is a sectional view on the line 3—3 of Fig. 2.

Fig. 5 is a sectional view on the line 5—5 of Fig. 1.

Fig. 6 is a sectional view on the line 6—6 of Fig. 4.

Fig 7 is a sectional view on the line 7—7 of Fig. 4 showing certain control valves.

Fig. 8 is a similar view showing certain of the valves in different positions.

Fig. 9 is a sectional view on the line 9—9 of Fig. 4.

Fig. 10 is a sectional view on the line 10—10 of Fig. 4.

Fig 11 is a sectional view on the line 11—11 of Fig. 6.

Fig. 12 is a partial section on the same line showing a valve in a different position.

Fig. 13 is a similar view showing the valve in still another position.

Fig. 14 is a sectional view on the line 14—14 of Fig. 6.

Fig. 15 is a similar view showing a valve member in the position corresponding with that indicated in Fig. 12.

Fig. 16 is a similar view showing the valve member in the position indicated in Fig. 13.

Fig. 17 is a front elevation of certain control devices.

Fig. 18 is a sectional view on the line 18—18 of Fig. 17.

Fig. 19 is a sectional view on the line 19—19 of Fig. 4.

Fig. 20 is a view in the nature of a development in which the parts are shown in many cases out of their natural relationship in order to indicate their cooperation in the machine.

Fig. 21 is a diagram of the fluid circuits used in the machine.

Figure 1:
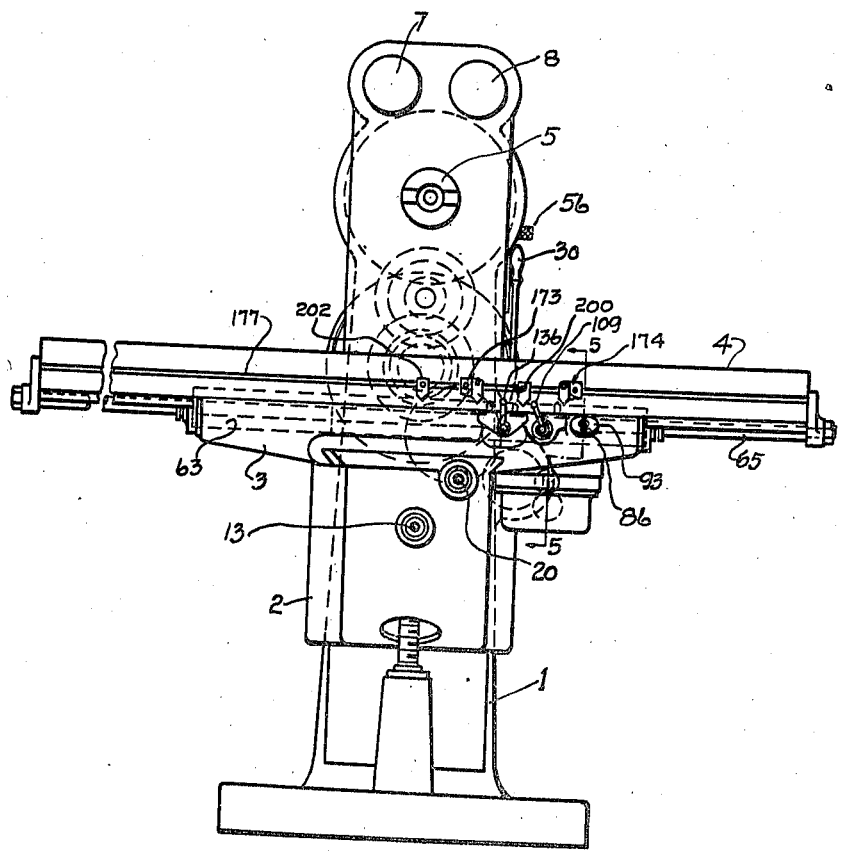
Fig. 1 is a front elevation of a machine incorporating the invention.

As shown in Figs. 1 and 2, the machine comprises a column 1 having vertically movable on a face thereof a knee or support 2 carrying a saddle member 3 slidable on the knee toward and from column 1. Saddle 3 carries a table or work support 4 slidable thereon to the left and right in Fig. 1. A tool spindle 5 is suitably journaled in column 1 at an upper level thereof and may be driven from a suitable power source, in the present instance indicated by a pulley 6. The overarms 7 and 8 are adjustably fixed in column 1 at an upper level thereof for supporting pendants, or the like, not shown, in well-known manner.

Vertical movements of knee 2 may be produced by actuation of an elevating screw 9 engaging a suitable nut 10 fixed in a portion 11 of column 1, the screw engaging at its upper end a thrust bearing 12 fixed in the knee. Screw 9 may be rotated by means of a crank, or the like, not shown, applied to the squared end portion 13 of a shaft 14 suitably journaled in the knee and driving the screw through bevel gears 15 and 16 fixed respectively with shaft 14 and screw 9.

A second screw 17 is provided for moving saddle 3 relative to knee 2, the screw engaging a nut portion 18 fixed with saddle 3 and being fixed against axial movement relative to the knee in a suitable thrust bearing 19. A squared portion 20 is provided on the screw for reception of a crank, or the like, not shown, for rotating it.

As shown in Figs. 2 and 20, spindle 5 is driven from pulley 6 in the following manner: Pulley 6 is fixed with and drives a sleeve 21 suitably journaled in column 1 and driving through a clutch generally denoted by numeral 22 a shaft 23. Shaft 23 drives a shaft 24 through a rate changer generally denoted by numeral 25 and shaft 24 drives spindle 5 through gears 26 and 27 fixed respectively on shaft 24 and spindle 5.

Clutch 22 comprises an outer member 28 fixed with sleeve 21 and an inner member 29 slidably keyed with shaft 23 and movable into and out of frictional contact with member 28 when desired, shaft 23 fitting at its right end into a suitable bore forming a pilot bearing therefor in sleeve 21.

Member 29 may be moved into and out of driving relation with member 28 through a hand lever 30 located outside of column 1 within convenient reach of an operator and fixed with a short shaft 31 journaled in a suitable bearing in column 1. Shaft 31 has fixed therewith inside the column a lever 32 actuating, through a pivoted link 33, a lever 34, Fig. 3, fixed with a shifter fork 35 which in turn is fixed with a short shaft 36 journaled in a suitable bearing in column 1. Fork 35 has pivoted shoes 37—38 engaging an annular groove 39 formed in a portion of member 29 whereby movement of lever 30 to the left or right in Fig. 2 will cause corresponding movement of member 29 and disengagement or engagement respectively of clutch 22. Lever 34 has a downwardly extending cam portion 40 (see Fig. 2) engaging a detent 41, Fig. 3, slidable in a suitable bore 42 in a member 43 fixed with column 1, a spring 44 being disposed in bore 42 for pressing the detent upwardly, cooperation thereof with cam portion 40 serving to maintain clutch 22 in engaged or disengaged position as desired.

The rate changer 25 comprises the triple gear member 45, Fig. 2, slidably keyed on shaft 23 and comprising gears 46, 47, and 48 respectively, engageable upon sliding movement of member 45 with gears 49, 50, and 51 fixed with shaft 24, the gears being of different ratios whereby engagement of the different pairs will result in different speeds in spindle 5. Gear member 45 may be moved by means of a hand lever 52 fixed outside the column with a shaft 53 journaled in a suitable bearing in a wall of the column, as more particularly shown in Fig. 3, the shaft carrying on its inner end a lever 54 having a pivoted shoe 55 engaging the sides of gear 47, so that movement of the lever to the left and right in Fig. 2 will cause movement of gear member 45 to the right and left, as will be understood. A grip portion 56 is provided on member 52 and has a spring pressed pin of familiar type engageable with holes such as 57 and 58 in the column wall for holding the parts in shifting positions.

The mechanism for driving table 4 is hydraulic in its nature and comprises, as shown in Figs. 6 and 21, a pump generally denoted by numeral 59 driven from pulley 6 and taking fluid from a suitable reservoir 60. The fluid is delivered through suitable passages, and a reverser valve generally denoted by numeral 61 to a fluid motor generally denoted by numeral 62, see also Fig. 4, and comprising a cylinder 63 in which is reciprocably fitted a piston 64, connected for driving table 4 through a suitable piston rod 65, fluid exhausted from motor 62 returning to reservoir 60, suitable control devices being incorporated in the various passages, as will be presently clearly apparent.

Pump 59 may be of any suitable type, in the present instance, however, comprising gears 66 and 67 meshed together in a closely fitting housing member 68, as shown in Fig. 6, gear 66 being driven from pulley 6, see Fig. 2, through a gear 69 fixed with sleeve 21 and driving, through an idler 70 journaled on a stud 71, a gear 72. Gear 72 is fixed with a shaft 73 which drives, through an extensible universal joint shaft of well-known type generally denoted by numeral 74, a shaft 75 extending through a wall of reservoir 60, Fig. 5, into housing 68 and fixed in gear 66. A gland 76 or other suitable packing device is provided at the point where shaft 75 enters housing 68 to prevent leakage of fluid from or into the housing, and the bores for the gears are slightly relieved adjacent discharge port 118, as shown in Fig. 6, to provide improved operation in accordance with an application, Serial No. 538,931, filed May 2, 1931.

The pump housing 68, as shown in Figs. 6 and 7, provides suitable passages for fluid to and from the gears. Fluid passes from reservoir 60 through a suction pipe 77 into a passage 78 from which it may be drawn through a cut-off valve 79 and a port 80 into a channel 81 communicating with an inlet port 82 formed in the wall of housing 68. Port 80 may be more or less obstructed by a tapered end portion 83 of a plunger 84 forming a feed regulating throttle generally denoted by numeral 85.

Figure 4:
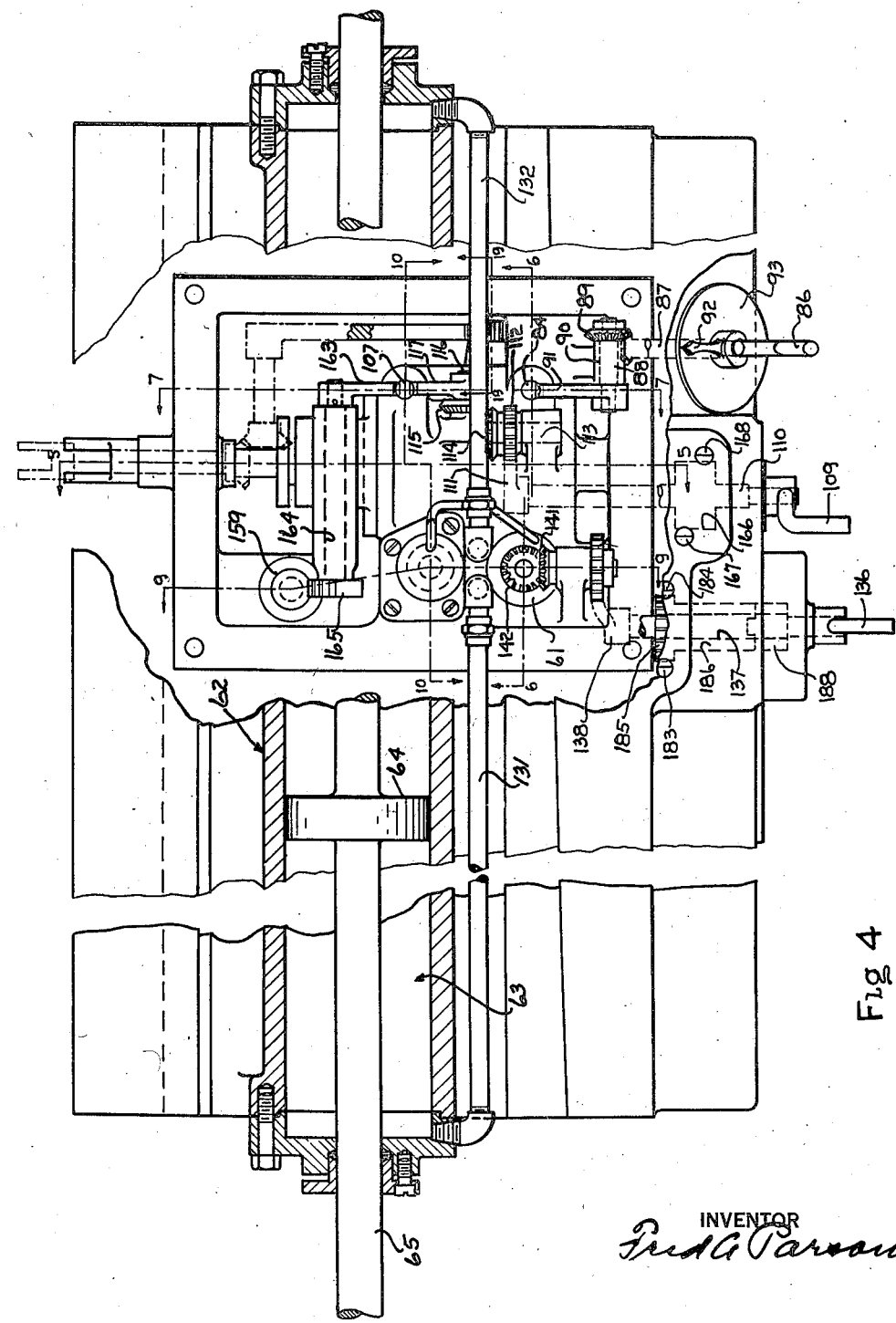
Fig. 4 is a plan view partly in section showing certain details of the feed transmission.

Plunger 84 may be moved up and down in Fig. 7 to admit more or less fluid through port 80 by means of a hand lever 86, Fig. 4. The lever is fixed with a shaft 87 driving, through bevel gears 88 and 89, a shaft 90 journaled in a portion of saddle 3 and having fixed therewith a sector 91 engaging suitable rack teeth formed on plunger 84. A pointer or index 92 indicates against a scale 93 the various positions of the parts, the scale being graduated in inches per minute, or any other suitable or desired designation of speeds or valve positions.

In the present machine the capacity of pump 59 is largely in excess of that of throttle 85, so that for any given setting of the throttle there will never be sufficient fluid passing through inlet port 82 to supply the demands of pump 59. Accordingly what fluid is admitted will be immediately transferred by gears 66 and 67 to the discharge side of the pump and a high vacuum condition will be maintained at the intake side. The pressure tending to force fluid through throttle 85 will acocrdingly remain substantially constant, namely, the difference between atmospheric pressure and a substantially perfect vacuum regardless of speed, load, or other conditions in other parts of the system. The rate of travel of table 4 will accordingly be substantially proportionate to the degree of opening of throttle 85 under all conditions.

In a milling machine it is desirable that there be no possibility of operating the table at a feed rate at such times as the spindle is not in operation. Accordingly cut-off valve 79 in the present illustrative machine is interconnected with the main or spindle clutch 22 in the following manner: Shaft 36, Fig. 3 extends outside of column 1 into a housing 94 fixed with the column and drives, through bevel gears 95 and 96, a short shaft 97 suitably journaled in the housing. Shaft 97 drives, through an extensible universal joint shaft of well-known type generally denoted by numeral 98, Fig. 2, a shaft 99, Figs. 5 and 6, journaled in saddle 3. Shaft 99, as shown in Fig. 6, drives a shaft 100 through bevel gears 101 and 102 meshed together and fixed with the respective shafts, shaft 100 being journaled in a portion of saddle 3 and carrying fixed therewith sector 103 extending downwardly and engaging a gear 104 fixed with a stem portion 105, Fig. 19, of cut-off valve 79. The parts are so arranged and proportioned that valve 79 will stand in the position indicated in Fig. 7 at such times as clutch 22 is engaged, while it will stand in the position indicated in Fig. 8 at such times as clutch 22 is disengaged. Accordingly fluid cannot find its way through throttle 85 at times when clutch 22 is disengaged and spindle 5 is at rest, and the table accordingly cannot be driven at a feed rate at times when the spindle is not running.

As stated above, pump 59 has a capacity largely in excess of that necessary for feeding movement of table 4 and the full capacity is made available for rapid traverse of the table through the provision of a separate inlet or rapid traverse valve generally denoted by numeral 106, Fig. 7. The valve comprises a plunger 107 vertically slidable in a suitable bore in a portion of housing 68 and having an end portion adapted, when the plunger is down, to close a port 108, as shown in the figure. The plunger may be raised, however, into the position indicated in Fig. 8, whereupon fluid may flow to the right in passage 78 through port 108 and channel 81 to inlet port 82, Fig. 6, the fluid then passing through the pump and on to the motor, as above outlined.

Plunger 107 may be moved from a lever 109, Figs. 4, 18. Lever 109 is fixed with a shaft 110 journaled in saddle 3 and carries a sector 111 fixed therewith and engaging a gear 112 journaled on a suitable stud 113 fixed with a portion of saddle 3. Gear 112 drives, through a bevel gear 114 fixed therewith, a bevel gear 115 journaled on a stud 116 and having fixed therewith a sector 117, more particularly shown in Fig. 7, engaging suitable rack teeth formed in plunger 107. Movement of lever 109 to the right in Fig. 4 will accordingly cause downward movement of plunger 107 in Fig. 7, while opposite movement of the lever will cause raising of the plunger and operation of table 4 at a rapid traverse rate, as will be understood.

Outlet port 118, shown in Figs. 6 and 11, communicates through a passage 119 with a passage 120, Fig. 9, extending vertically in a portion of housing 68 and entering at its upper end port 121. Port 121 enters at an upper level a bore 122 forming a part of reverser valve 61. Port 121 also communicates with a relief valve generally denoted by numeral 123 comprising a ball 124 pressed against a suitable seat in the port by means of a spring 125, a plug 126 serving to maintain the spring in contact with the ball and adjust the tension thereof. Any fluid finding its way past ball 124 escapes through an opening 127 to reservoir 60. Spring 125 is adjusted so that ball 124 is maintained tightly against its seat under all normal operating conditions, but if the feed system is overloaded, accidentally or otherwise, the excessive pressure developed will force the ball off its seat against the pressure of the spring. The excess pressure will be relieved by escape of fluid from port 121, and damage to the mechanism will be prevented.

The reverser valve 61 comprises a plug member 128 rotatably fitted in bore 122 and having cut-away portions adjacent port 121, as particularly shown in Figs. 11, 12, and 13. Other ports 129 and 130 enter bore 122 at substantially the same level as port 121 but lateral thereto, as shown in Fig. 11, the ports communicating through ducts 131 and 132 respectively, Fig. 4, with the ends of motor cylinder 63.

A discharge or exhaust port 133, Fig. 11, leads from bore 122 substantially opposite port 121. If now plug member 128 be turned, for example to the position shown in Fig. 12, fluid coming from pump 59 through port 121 will pass through bore 122 to port 130 and through duct 132 to the right end of cylinder 63, causing movement of piston 64 to the left. Fluid in the left end of cylinder 63 will escape through duct 131, port 129, and bore 122 into discharge port 133. On the contrary, if plug member 128 is turned to the position shown in Fig. 13, fluid will flow into port 129 through duct 131 to the left end of cylinder 63, forcing piston 64 and table 4 to the right, fluid in the right end of cylinder 63 escaping through duct 132 and port 130 to discharge port 133.

As particularly shown in Figs. 9, 15, 14, and 16, passage 120 also extends downwardly and enters bore 122 at the level of a port 134 formed in plug member 128, and port 135 also enters bore 128 at a point such that it may connect with passage 120 through port 134 under certain conditions. Port 134 is so related to cut-away portions shown in Figs. 11, 12, and 13 that port 135 will be connected, through port 134, with passage 120 at such times as the reverser valve stands in the position indicated in Fig. 11. Fluid is then prevented from passing to motor 62, but finds free escape through port 135, thus relieving the pump from pressure at such times as it is not desired to operate the table.

When the table is being driven as above outlined the port 135 is closed as indicated in Figs. 16 and 15 by an imperforate portion of plug 128, the position of plug 128 in Fig. 11 being identical with that of Fig. 14 and that of Figs. 12 and 13 being identical with that of Figs. 15 and 16, respectively.

Plug 128 may be turned when desired from a hand lever 136, Fig. 4, fixed with a shaft 137 suitably journaled in a portion of saddle 3 and actuating, through a sector 138 fixed with the shaft, a gear 139. Gear 139 is fixed with a shaft 140, Fig. 9, journaled in a suitable bearing supported from saddle 3 and having fixed therewith a bevel gear 141 meshing with a bevel gear 142 fixed with plug 128. Movement of lever 136 to the left will accordingly cause clockwise rotation of plug 128, as seen in Fig. 4, resulting in the situation shown in Fig. 12. This position of plug 128 will, as above explained, cause flow of fluid into the right end of cylinder 63, Fig. 4, and accordingly movement of table 4 to the left. Obviously opposite movement of lever 136 will cause opposite movement of the connected parts and plug 128 and movement of table 4 to the right. The direction of movement of lever 136 accordingly indicates the direction in which table 4 may be expected to travel.

In a milling machine it is desirable that some means be provided for preventing the table from overrunning its transmission, since in certain kinds of milling the cutter may tend to pull the table along at a rate greater than the desired feed rate and cause damage. In the present illustrative machine such undesirable movement is prevented by maintaining a back pressure in the discharge side of motor cylinder 63. Referring to Fig. 9, port 133 which, as above outlined, is connected with whichever of passages 131 and 132, Fig. 4, is at the moment discharging fluid from cylinder 63, connects with a passage 143 which communicates with a passage 144 through a back pressure valve generally denoted by numeral 145. As more particularly shown in Fig. 10, the valve comprises a plunger 146 slidable in a bore 147 intersecting passages 143 and 144. Plunger 146 has a piston 148 fixed therewith and slidably fitting in a cylinder 149 and is pressed upwardly therein by means of a suitable spring 150, a vent 151 providing free access of atmospheric pressure to the under side of piston 148. A port 152 is formed in plunger 146 and of such size and shape as to register to a greater or less degree with ports 143 and 144 according to the position of plunger 146.

Obviously spring 150 may be given any desired characteristics, as also may port 152, so that any desirable degree of back pressure may be automatically provided in the exhaust passages for any given condition of load and feed of the table.

A substantially constant back pressure of any suitable or desired value may be maintained in the exhaust passages by means of a valve generally denoted by numeral 153, Fig. 9, the valve comprising a ball 154 pressed against a suitable seat in passage 144 by means of a spring 155, the spring being retained in contact with ball 154 by means of a plug 156. The spring may be replaced with others of different characteristics if it is desired to change the constant back pressure, and plug 156 may be adjusted in or out to change the tension of the spring 155, if desired. The exhaust fluid escaping past ball 154 returns to reservoir 60 through an opening 157.

It will be apparent at this point that although the table could be driven at a rapid traverse rate by merely admitting fluid to pump 59 through valve 106, in case valves 145 and 153 were so adjusted as to produce a substantial back pressure in passage 143, a substantially increased volume of fluid flow through these valves under rapid traverse conditions would give rise to an unnecessary expenditure of power under these conditions. Also, if it were necessary to proportion these valves to care for such a comparatively large volume of fluid, it might be difficult to cause them to govern with a sufficient degree of precision and sensitiveness the relatively small volume of fluid which would normally pass through them under feed conditions. In the present illustrative machine, therefore, a passage 158, Fig. 9, has been provided, leading from passage 144 through a rapid traverse bypass valve generally denoted by numeral 159 and a continuous back pressure valve generally denoted by numeral 160. These valves obviously may be proportioned to care for the larger volume of fluid which flows under rapid traverse conditions and valve 160 may be so constituted and adjusted as to provide only a relatively light back pressure.

Valve 159 comprises a plunger 161 vertically slidable in a suitable bore in member 68 intersecting a bore 158. The plunger has an opening therethrough 162 which may or may not register with bore 158 according to the position of the plunger. Plunger 161 is automatically movable in accordance with the movement of plunger 107, Fig. 7, in the following manner: Plunger 107 has suitable rack teeth engaging a sector 163 fixed with a shaft 164 journaled in a projection of member 68 and carrying a gear 165, Fig. 9, engaging other rack teeth in plunger 161. The parts are so proportioned that at such times as plunger 107 closes port 108, plunger 161 will be raised to the position shown in Fig. 9 and opening 162 will fail to register with port 158. Accordingly all fluid passing through passage 143 will be forced to pass through valve 145 and valve 153. As above explained, this would be the situation in case the table were proceeding at a feed rate and accordingly valve 145 would be free to prevent undesired movement of table 4. On the contrary, if plunger 107 were raised to admit the fluid in large volume to pump 59 for driving table 4 at a rapid traverse rate, plunger 161 would be depressed to a position in which opening 162 would register with port 158. The relatively large volume of fluid would find a ready escape through the opening and through valve 159 which, as above explained, would normally be adjusted for a relatively light back pressure.

The various valves controlling the direction and rate of movement of the table may be controlled from table dogs when desired, whereby the various movements of the table may be rendered automatic to any desired degree.

Plunger 107 may be so controlled as follows: Referring to Figs. 4, 17, and 18, shaft 110, which, as above explained, operates plunger 107 from hand lever 109, has fixed therewith a gear 166 located in a suitable recess in saddle 3 and a pair of trip plungers 167 and 168 vertically slidable in the saddle engage opposite sides of the gear as shown. Rotation of the gear will accordingly raise one plunger and lower the other, and accordingly depression of one plunger will rotate the gear and raise the other plunger. As shown in Fig. 5, these plungers are located at different distances from the edge of table 4 for a purpose which will appear presently. Shaft 110 has fixed therewith, Figs. 17 and 18, a cam 169 having an edge portion 170 adapted to cooperate with a detent plunger 171 slidable in a suitable bore in saddle 3 and pressed upwardly therein by means of a spring 172, the plunger and cam cooperating to yieldingly hold the parts in one of their shifted positions.

Plungers 167 and 168 may be contacted at predetermined points in the movement of table 4 by dogs 173 and 174, respectively, dog 174 depressing plunger 168 at such times as plunger 158 is raised and, through the various connections, lowering plunger 107, Fig. 7, and causing the table to proceed at a feed rate. Dog 173 on the contrary is so positioned as to contact plunger 167 and, raising plunger 168, Fig. 6, to cause rapid traverse movement of table 4. Obviously as many of these dogs as desirable may be supplied of both types, whereby a change from feed to rapid traverse or vice versa may be automatically accomplished at any desired point in the movement of the table.

The dogs may be of any suitable or well-known type, but are preferably constructed so that each will effect movement of its plunger during movement of the table in one direction, but will not effect the plunger during movement in the opposite direction. For instance, dog 174 has a body portion 175 which may be adjustably and removably fixed with table 4 by means of a suitable bolt 176 of well-known type engaging a T-slot 177. A latch or tongue member 178 is pivoted to body member 175 on a pin 179 and is prevented from pivotally moving in one direction by means of an abutment 180 fixed with body portion 175. Accordingly upon movement of the dog to the left, as shown in the figure, a cam portion 181 of tongue member 178 will contact plunger 168 and depress the same. However, in the event that the dog approaches the plunger while moving to the right, tongue member 178 upon contact with plunger 168 will pivot in a clockwise direction about pin 179 without depressing the plunger, detent 171 and its spring 172 being sufficiently powerful to prevent movement of the parts under the pressure necessary to cause such pivotal movement. A spring 182 may be used in this type of dog for returning tongue 178 to the position shown after such pivotal movement. The detailed description of this dog 174 may obviously be applied to dog 173 which is exactly similar, but designed for operation in the opposite direction. Similarly other dogs may be provided similar to dog 174, but designed to contact plunger 167 instead of plunger 168, and in like manner dogs similar to dog 173 may be applied and adapted to contact plunger 168 instead of plunger 167. Such dogs may be arranged in any suitable combination in T-slot 177 and together with reversing dogs presently described would render the machine automatically operable in a great variety of different commercial cycles. The exact construction of these dogs and plungers is not considered a part of this invention, that disclosed being merely illustrative and to a certain extent conventional and designed merely to show an operative method of automatically controlling a fluid transmission of the above described characteristics.

It is to be noted that the automatic shift from feed to quick traverse may be made with a transmission of this type without the use of any lost motion or so-called "snap-over" devices, since at no time is the feed of fluid to pump 59 interrupted through the action of the rapid traverse controls. There is, therefore, no period when the power drive to the table is interrupted and therefore no "dead center" position through which the mechanism must be carried during such period.

As above described, reverser valve 61 may be turned from hand lever 136 through various connections including shaft 137, Figs. 4, 5, and 17. Automatic control of this valve may be obtained from table dogs acting on plungers 183 and 184 vertically slidable in saddle 3 and engaging opposite sides of a gear 185 fixed with a sleeve 186 rotatable in a bore in saddle 3 and embracing shaft 137. Sleeve 186 is coupled with a lost motion device generally denoted by numeral 187, as indicated in Fig. 4, whereby rotation of the one will cause rotation of the other. As shown in Fig. 17, the lost motion device comprises a yoke 188 rotatable on shaft 137 and having depending arms 189 and 190 carrying adjusting screws 191 and 192 respectively. A tongue 193 fixed with shaft 137 projects downwardly therefrom between screws 191 and 192, the shaft and yoke being in mutual driving relationship through tongue 193 and screws 191 and 192 with or without lost motion according to the adjustment of the screws. Sleeve 186 has also fixed therewith a cam 194 which, as more particularly shown in Fig. 17, has faces 195 and 196 between which is a central notch 197. A plunger 198, Fig. 17, is slidably mounted in saddle 3 and pressed upwardly by means of a spring 199, the plunger cooperating with cam 194 to either move it or maintain it in desired positions, as will be presently apparent.

Assuming screws 191 and 192 to be adjusted to contact tongue 193, movement of hand lever 136 to the left, for example, will, through screw 191 engaging tongue 193, turn yoke 188, cam 194, and gear 185 to the left, raising plunger 184 and lowering plunger 183. At the same time such movement of the hand lever will move valve 61, as above described, to cause movement of table 4 to the left, as seen in Fig. 6. At a predetermined point in such movement of the table, a dog 200, adjustably fixed with table 4 by means of a bolt 201 engaging the above mentioned T-slot 177, will contact and depress plunger 184, turning gear 185, Fig. 17, in a clockwise direction.

Such movement of the gear will, through coupling of sleeve 186 with yoke 188, cause similar movement of the yoke, through engagement of screw 192 with tongue 193, cause rotation of shaft 137 also in a clockwise direction. Such movement of cam 194 will depress plunger 198 which at the moment would be in engagement with cam face 195 and initiate a movement of valve 61 towards the position indicated in Figs. 11 and 14. Since no lost motion was at this time present between screw 192 and tongue 193, valve 61 would arrive at the position shown in Figs. 11 and 14 and at substantially the same instant that cam 194 arrives at the position shown in Fig. 17. This position of the valve would, as above explained, cut off all flow of fluid to cylinder 63 and accordingly stop the movement of the table.

At the same time plunger 198 would engage central notch 197 and yieldingly maintain the hand lever 136 and connected parts against accidental displacement. The above described operation takes place in an exactly similar manner upon movement of table 4 to the right, under these circumstances plunger 183 being raised and at the desired point contacted by a dog 202 fixed to the table by means of a bolt 203.

In the event that it is desired to cause automatic reverse of a table instead of the automatic stop just described, it is merely necessary to provide lost motion between tongue 193 and one or another of screws 191 and 192. For example, if it is desired to cause the table to travel to the left, automatically reverse and travel to the right, screw 192 is backed away from tongue 193 a predetermined amount, hand lever 136 is then moved to the left as above described, whereupon the table moves to the left as in the prior operation and plunger 198 is forced out of central notch 197 and engages cam face 195. At the desired point dog 200 again engages plunger 184 and depresses the same, gear 185 and yoke 188 serving through screw 192 and tongue 193 to initiate a clockwise rotation of shaft 137 and movement of valve 61 toward the position shown in Figs. 11 and 14.

However, since lost motion has been provided between the screw 192 and tongue 193, shaft 137 and valve 61 will lag behind gear 185, cam 194, and yoke 188 to a certain extent. Accordingly at the instant that cam 194 has arrived at the central position shown in Fig. 17, valve 61 will not have arrived at the position shown in Figs. 11 and 14 and accordingly table 4 will continue to move and dog 200 to depress plunger 184 until plunger 198 has again been forced out of central notch 197 and engaged cam face 196. At this point the plunger will immediately act on the cam face to cause a rotation of cam 194, gear 185 and, through screw 192 and tongue 193, shaft 137 in a clockwise direction.

The range of travel of cam 194 actuated by plunger 198 is such as to take up the lost motion between the screw and the tongue and rotate shaft 137 in a clockwise direction sufficiently to turn valve 61 to the position indicated in Figs. 13 and 16, raising plunger 183 and depressing plunger 184. As above explained, this will admit fluid to the left end of cylinder 63 and cause movement of table 4 to the right. At a desired point in such movement dog 202 will again contact plunger 183 and cause the table to stop, as above described. If, however, screw 191, Fig. 17, is also backed away from tongue 193, a reversal of the table will take place at this point as well as at the end of its leftward travel. Accordingly, through proper adjustment of screws 191 and 192 the table may be caused to stop or reverse at either end of its stroke as desired.

It is to be noted that plungers 183 and 184 are in a different plane from either of plungers 167 and 168, so that there is no interference with the reverse plungers from the rapid traverse dogs. This is particularly shown in Fig. 5.

The above being a full and complete description of a machine illustrating a typical embodiment of the invention, what is claimed is:

1. In a milling machine, the combination of a rotatable tool spindle, a support for said spindle, a work support, one of said supports being bodily movable in a direction transverse to the axis of said spindle, a power train for rotation of said spindle including means operable for interruption of said rotation, a transmission for actuating said movable support including a fluid pump and a fluid motor driven by fluid from said pump, means for controlling delivery of fluid from said pump to said motor including means shiftable for effecting a relatively low feed rate and for alternatively effecting a relatively high rapid traverse rate, and a device operative to prevent said feed rate effect from said shiftable means when said rotation interrupter is in its rotation interrupting position.

2. In a milling machine, the combination of a rotatable tool spindle, a support for said spindle, a work support, one of said supports being bodily movable in a direction transverse to the axis of said spindle, a train for rotation of said spindle including a power source and means operable for interrupting said rotation, a transmission for actuating said movable support including a fluid pump and a fluid motor driven by fluid from said pump, an inlet passage for said pump, and control means for said transmission including throttle means operable to control the area of said inlet passage for alternatively effecting a relatively slow feed rate of said motor or a relatively fast rapid traverse rate thereof, and means operative in accordance with the position of said rotation interrupter to prevent said feed rate effect of said throttle means when said rotation interrupter is in its rotation interrupting position.

3. In a milling machine, the combination of a rotatable tool support and a work support, one of said supports being bodily movable in a direction transverse to the axis of said tool support, a power train for rotation of said tool support including a power source and means operable for interrupting said rotation, a transmission for actuating said bodily movable support including a fluid pump and a fluid motor driven by fluid from said pump, an inlet for said pump, and control means for said transmission including a first throttle shiftable for pre-selecting a relatively low feed rate and a second throttle shiftable for alternatively effecting said pre-selected feed rate or a relatively high quick traverse rate, each of said throttles being independently adjustable and each adapted to control the flow of fluid through said inlet, and means operable in accordance with the position of said rotation interrupter for preventing said feed rate when said rotation interrupter is in rotation interrupting position, the last mentioned means including a third throttle associated with said inlet.

4. In a milling machine, the combination of a rotatable tool spindle, a support for said spindle, a work support, one of said supports being bodily movable in a direction transverse to the axis of said spindle, a power train for rotation of said spindle and including a power source and a shiftable motion interrupter, a transmission for driving said movable support including a fluid pump having an inlet passage and driven from said power source exclusive of said motion interrupter and rate changer, and a motor driven by fluid from said pump, and control means for said transmission including throttle means associated with said inlet and collectively adjustable for effecting a series of relatively low feed rates of fluid delivered to said pump and a relatively high rapid traverse rate thereof.

5. In a milling machine, the combination of a rotatable tool spindle, a support for said spindle, a work support, one of said supports being bodily movable in a direction transverse to the axis of said spindle, a power train for rotation of said spindle and including a power source and a motion interrupter, a transmission for driving said movable support including a fluid pump driven from said power source exclusive of said motion interrupter, and a motor driven by fluid from said pump, and control means for said transmission including a throttle shiftable to control the delivery of fluid from said pump to said motor to predetermine one of a series of feed rates of such fluid delivery, and another throttle shiftable independently of the first mentioned throttle to control the delivery of fluid from said pump to said motor to alternatively effect said predetermined feed rate or a relatively fast rapid traverse rate.

6. In a milling machine, the combination of a rotatable tool spindle, a support therefor, a work support, one of said supports being bodily movable in a direction transverse to the axis of said spindle, a power source for the machine, a power train for rotating said spindle from said power source and including a motion interrupter, a transmission for driving said movable support including a fluid pump driven from said power source exclusive of said motion interrupter and a motor driven by fluid from said pump, and control means for said transmission including reversing means for determining the direction of support movement, a throttle shiftable to control the delivery of fluid from said pump to said motor for pre-selecting one of a series of relatively slow feed rates, a device alternatively shiftable for effecting said pre-selected feed rate or a relatively high quick traverse rate of fluid delivery from said pump to said motor, said throttle and device being operable independently of one another and of said reversing means, and automatic means for operating said reversing means and said device at predetermined points in the movement of said movable support.

7. In a milling machine, the combination of a rotatable tool spindle, a support therefor, a work support, one of said supports being bodily movable in a direction transverse to the axis of said spindle, a power source for the machine, a power train for rotation of said spindle from said power source and including a shiftable motion interrupter, a lever operable for shifting said motion interrupter, a transmission for driving said movable support and including a fluid pump driven from said power source exclusive of said motion interrupter and a motor driven by fluid from said pump, and control means for said transmission including means selectively operable for effecting a feed rate of said motor or for effecting a relatively high rapid traverse rate thereof, and means operable from said lever for preventing the operation of said selectively operable means to effect said feed rate when said motion interrupter is in a motion interrupting position.

8. A milling machine as specified in claim 7 in which said means operable from said lever includes a shiftable throttle associated with the inlet passage of said pump and operable to restrict the flow of fluid therethrough.

9. In a milling machine, the combination of a rotatable tool spindle, a support therefor, a work support, one of said supports being bodily movable relative to the other in a direction transverse to the axis of said spindle, a power source for the machine, a power train for rotation of said spindle from said power source including a motion interrupting clutch, means for controlling said clutch, a transmission for driving said movable support including a fluid pump driven from said power source exclusive of said clutch, a motor driven by fluid from said pump and connected for driving said movable support, means for controlling said transmission for a series of feed rates including a shiftable throttle operable to change the delivery of fluid from said pump to said motor, means shiftable independently of said throttle for alteratively effecting a feed rate determined by said throttle or for effecting a relatively high rapid traverse rate of fluid delivery to said motor, and means responsive to the position of said clutch control means for preventing said feed rate effect of said shiftable means during such times as said clutch is in a motion interrupting position.

10. In a machine tool, the combination of a work support and a tool support, one of which is bodily movable, a transmission for movement of said movable support including a pump and a motor having an inlet passage connected from said pump and having an outlet passage, and control means for said transmission including a device alternatively operable for effecting a feed rate of fluid delivery from said pump to said motor or for effecting a relatively rapid traverse rate thereof, shiftable throttle means associated with said outlet, and means controlling said throttle means in accordance with the fluid pressure in one of said passages.

11. In a milling machine, the combination of a rotatable tool spindle, a work support, a support for said spindle, one of said supports being bodily movable in a direction transverse to the axis of said spindle, a power source, a power train connectible for rotation of spindle from said power source, a transmission for driving said movable support including a fluid pump driven from said power source and a motor having an inlet passage connected from said pump and having an outlet passage, and control means for said transmission including a first device adjustable for pre-selecting one of a series of feed rates of fluid delivery from said pump to said motor and a second device alternatively operable for effecting said pre-selected feed rate or for effecting a relatively high quick traverse rate of fluid delivery from said pump to said motor, shiftable throttle means associated with said outlet passage, and means operable for shifting said throttle means in accordance with the fluid pressure in one of said passages.

12. In a machine tool, the combination of a work support and a tool support, one of which is bodily movable, a transmission for movement of said movable support including a pump and a motor having an inlet passage connected from said pump and having an outlet passage, and control means for said transmission including a device alternatively operable for effecting a feed rate of fluid delivery from said pump to said motor or for effecting a relatively high rapid traverse rate thereof, shiftable throttle means associated with said outlet and normally restrictive thereof, means for shifting said throttle means in accordance with the pressure of fluid in one of said passages, and means operative in accordance with the operation of said device to render said throttle means substantially inoperative to restrict said outlet when said device is operative for said relatively high rate of fluid delivery.

13. In a milling machine, the combination of a rotatable tool spindle, a support for said spindle, a work support, one of said supports being bodily movable in a direction transverse to the axis of said spindle, a power source, a power train driven from said source and connected for rotation of said tool spindle and including a motion interrupter, a transmission for driving said movable support including a pump driven from said power source to exclude said motion interrupter and a motor having an inlet passage connected from said pump and having an outlet passage, and control means for said transmission including means alternatively operable for effecting fluid delivery from said pump to said motor at a selected one of a plurality of feed rates or at a relatively fast quick traverse rate, shiftable throttle means associated with said outlet passage, and means operable in accordance with fluid pressure in said inlet passage and connected to shift said throttle means.

14. In a milling machine, the combination of a rotatable tool spindle, a support for said spindle, a work support, one of said supports being bodily movable in a direction transverse to the axis of said spindle, a power source, a power train driven from said source and connected for rotation of said tool spindle and including means for interrupting said rotation, a transmission for driving said movable support including a pump, and a motor having an inlet passage connected from said pump and having an outlet passage, and control means for said transmission including means operable for pre-selecting one of a series of feed rates of fluid delivery from said pump to said motor, a device alternatively operable for effecting said pre-selected feed rate or for effecting a relatively high quick traverse rate of fluid delivery from said pump to said motor, shiftable throttle means associated with said motor outlet passage, means operable in accordance with fluid pressure in one of said passages to shift said throttle means, and means operable in accordance with the operation of said rotation interrupter to prevent said feed rate effect of said device when said rotation interrupter is in rotation interrupting position.

15. In a transmission, the combination of a pump, a reservoir of liquid, an inlet for said pump and communicating with said reservoir, a motor connected to be driven by liquid from said pump, and control means for said transmission for effecting a series of relatively low rates and a relatively high rate of said motor and comprising throttle means governing the rate of liquid delivery to the inlet of said pump to determine each of said rates.

16. In a transmission, the combination of a pump, a motor connected to be driven by liquid from said pump, and control means for said transmission for effecting a series of relatively low rates and a relatively high rate, said control means including a plurality of independently operable throttles respectively for different of said rates and each operable to control the flow of liquid from said pump to said motor.

17. In a transmission, the combination of a pump, a motor connected to be driven by liquid from said pump, and control means for said transmission including valve means for reverisng the direction of movement of said motor, and means for effecting a series of relatively low rates and a relatively high rate, the last mentioned means including a first throttle for said series of low rates and a second throttle for said high rate, said throttles being adjustable independently of one another and each adjustable independently of said reversing means, and each operable to control the flow of liquid from said pump to said motor.

18. In a transmission, the combination of a pump, a motor driven by liquid from said pump, means for controlling the rate of delivery of liquid from said pump to said motor including a plurality of independently adjustable throttles, one of said throttles being manually adjustable to different positions respectively pre-selective of different relatively slow rates of said liquid delivery, rate indicating means associated with the last mentioned throttle, the other of said throttles being adjustable to alternatively effect the rate pre-selected by said last mentioned throttle or to effect a relatively rapid rate of said liquid delivery, a dog movable from said motor and control means operated from said dog to adjust said other throttle at a predetermined point in the movement of said motor.

19. In a transmission, the combination of a pump, a reversibly operable motor driven by liquid from said pump, and means for controlling the delivery of liquid from said pump to said motor including reverser valve means for changing the direction of actuation of said motor, a first throttle device adjustable for pre-selection of one of a series of relatively low rates of said liquid delivery, a second throttle device alternatively adjustable to effect the rate pre-selected by said first throttle or to effect a relatively high rate of said liquid delivery, a plurality of dogs each movable from said motor, and a plurality of means respectively for independently automatically actuating said second throttle device and said reverser valve means at predetermined points in the movement of said motor and respectively operable from different of said dogs.

20. In a transmission, the combination of a power train including a power source and a shiftable motion interrupter, a pump driven from said power source exclusive of said motion interrupter, a motor driven by liquid from said pump, means for controlling delivery of liquid from said pump to said motor including means shiftable for effecting a relatively low feed rate and alternatively shiftable for effecting a relatively high quick traverse rate, and a device operative to prevent said shiftable means from shifting to effect said low rate when said motion interrupter is in its motion interrupting position.

21. In a transmission, the combination of a train including a power source and a shiftable motion interrupter, a pump driven from said power source exclusive of said motion interrupter, a motor driven by liquid from said pump, a liquid reservoir, an inlet passage connecting said pump and reservoir, and control means including throttle means associated with said inlet passage and operable for alternatively effecting a relatively slow rate of said motor or a relatively fast rate thereof, and means operative to prevent said slow rate effect of said throttle means when said motion interrupter is in its motion interrupting position.

22. In a transmission, the combination of a power train including a power source and a shiftable motion interrupter, a pump driven from said power source exclusive of said motion interrupter, a motor driven by liquid from said pump, a liquid reservoir, an inlet for said pump and connected with said reservoir, and control means for said transmission including a first throttle shiftable for pre-selecting one of a series of relatively low rates and a second throttle shiftable for alternatively effecting said pre-selected low rate or a relatively high rate, each of said throttles being independently adjustable and each adapted to control the flow of liquid through said inlet, and means for preventing said low rate when said motion interrupter is in motion interrupting position, the last mentioned means including a third throttle associated with said inlet.

23. In a transmission, the combination of a power train including a power source, a shiftable motion interrupter, a pump having an inlet passage and driven from said power source exclusive of said motion interrupter, and a motor driven by liquid from said pump, and control means including throttle means associated with said inlet passage and collectively adjustable for effecting a series of relatively low rates of liquid delivered to said pump and a relatively high rate thereof.

24. In a transmission, the combination of a power train including a power source, a motion interrupter, a pump driven from said power source exclusive of said motion interrupter, and a motor driven by liquid from said pump, and control means including a throttle shiftable to control the delivery of liquid from said pump to said motor to predetermine one of a series of relatively low rates of such liquid delivery, and another throttle shiftable independently of the first mentioned throttle to control the delivery of liquid from said pump to said motor to alternatively effect said predetermined low rate or a relatively fast rate of liquid delivery.

25. In a transmission, the combination of a power train including a power source, a motion interrupter, a pump driven from said power source exclusive of said motion interrupter and a motor driven by liquid from said pump, and control means including reversing means for determining the direction of motor movement, a throttle shiftable to control the delivery of liquid from said pump to said motor for pre-selecting one of a series of relatively slow rates thereof, a device alternatively shiftable for effecting said pre-selected rate or a relatively high rate of said liquid delivery, said throttle and device being operable independently of one another and of said reversing means, and automatic means for operating said reversing means and said device at various predetermined points in the movement of said motor.

26. In a transmission, the combination of a power train including a power source, a shiftable motion interrupter, a lever operable for shifting said motion interrupter, a pump driven from said power source exclusive of said motion interrupter, a motor driven by liquid from said pump, and control means including means selectively operable for effecting a low rate of liquid delivery from said pump to said motor or for effecting a relatively high rate thereof, and means operable from said lever for preventing the operation of said selectively operable means to effect said low rate when said motion interrupter is in a motion interrupting position.

27. A transmission as specified in claim 26 in which said means operable from said lever includes a shiftable throttle associated with the inlet passage of said pump and operable to restrict the flow of liquid therethrough.

28. In a transmission, the combination of a power train including a power source, a motion interrupting clutch, shiftable means for controlling said clutch, a pump driven from said power source exclusive of said clutch, a motor driven by liquid from said pump, a shiftable throttle operable to change the delivery of liquid from said pump to said motor for effecting a series of relatively low rates thereof, means shiftable independently of said throttle for alternatively effecting one of the low rates determined by said throttle or for effecting a relatively high rate of liquid delivery to said motor, and means responsive to the position of said clutch control means for preventing said low rate effect of said shiftable means during such times as said clutch is in a motion interrupting position.

29. In a transmission, the combination of a pump, a motor having an inlet passage connected with said pump and having an outlet passage, a device alternatively operable for effecting a relatively low feed rate of liquid delivery from said pump to said motor or for effecting a relatively high quick traverse rate thereof, shiftable throttle means associated with said outlet, and means controlling said throttle means in accordance with the pressure of liquid in one of said passages.

30. In a transmission, the combination of a power train, a pump driven from said train, a motor having an inlet passage from said pump and having an outlet passage, a first device adjustable for pre-selecting one of a series of relatively low rates of liquid delivery from said pump to said motor, a second device alternatively operable for effecting said pre-selected low rate or for effecting a relatively high rate of liquid delivery from said pump to said motor, shiftable throttle means associated with said outlet passage, and means operable for shifting said throttle means in accordance with liquid pressure in one of said passages.

31. In a transmission, the combination of a pump, a motor having an inlet passage connected from said pump and having an outlet passage, a device alternatively operable for effecting a low rate of liquid delivery from said pump to said motor or for effecting a relatively high rate thereof, shiftable throttle means associated with said outlet and normally restrictive thereof, means for shifting said throttle means in accordance with the pressure of liquid in one of said passages, and means operative in accordance with the operation of said device to render said throttle means substantially inoperative to restrict said outlet during said relatively high rate of liquid delivery.

32. In a transmission, the combination of a power train including a power source and a motion interrupter, a pump driven from said power source to exclude said motion interrupter, a motor having an inlet passage connected from said pump and having an outlet passage, means alternatively operable for effecting liquid delivery from said pump to said motor at a selected one of a plurality of relatively low rates or at a relatively fast rate, shiftable throttle means associated with said outlet passage, and means operable in accordance with liquid pressure in said inlet passage and connected to shift said throttle means.

33. In a transmission, the combination of a power train including a power source and a shiftable motion interrupter, a pump driven from said power source to exclude said motion interrupter, a motor having an inlet passage from said pump and having an outlet passage, means operable for pre-selecting one of a series of relatively low rates of liquid delivery from said pump to said motor, a device alternatively operable for effecting said pre-selected low rate or for effecting a relatively high rate of liquid delivery from said pump to said motor, shiftable throttle means associated with said motor outlet passage, means operable in accordance with liquid pressure in one of said passages to shift said throttle means, and means operable in accordance with the position of said motion interrupter to prevent said low rate effect of said device when said motion interrupter is in motion interrupting position.

34. In a milling machine, the combination of a rotatable tool spindle, a work support reciprocable in a direction transverse to the axis of said spindle, a power train for rotation of said spindle, control means for interrupting spindle rotation, a transmission for reciprocation of said support including a pump, a motor connected with said support, and a closed passage for delivery of liquid from said pump to said motor, control means for said transmission including means for selectively effecting one of a series of feed rates of liquid delivery from said pump to said motor and alternative means for effecting a relatively fast quick traverse rate of said liquid delivery, said control means being operative for said feed rate or said quick traverse rate to be alternatively available during a uni-directional movement of said support, a dog on said support and means operable from said dog for operation of said control means to effect a change from said relatively fast rate to said feed rate at an intermediate point in the movement of said support.

35. In a milling machine, the combination of a rotatable tool spindle, a work support reciprocable in a direction transverse to the axis of said spindle, a power train for rotation of said spindle, control means for interrupting spindle rotation, a transmission for reciprocation of said support including a pump, a motor connectible to receive liquid from said pump, control means for said transmission including means for selectively effecting one of a series of feed rates of liquid delivery from said pump to said motor and alternative means for effecting a relatively fast quick traverse rate of said liquid delivery, said control means being operative for said feed rate or said quick traverse rate to be alternatively available during a uni-directional movement of said support, and means operable in accordance with said rotation interrupting control means for preventing said feed rate effect except when said spindle is rotating.

FRED A. PARSONS.